United States Patent [19]
Chisvin et al.

[11] Patent Number: 5,388,222
[45] Date of Patent: Feb. 7, 1995

[54] MEMORY SUBSYSTEM COMMAND INPUT QUEUE HAVING STATUS LOCATIONS FOR RESOLVING CONFLICTS

[75] Inventors: Lawrence A. P. Chisvin, Sudbury; John K. Grooms, Webster; Joseph F. Rantala, Worcester; David W. Hartwell, Boxboro, all of Mass.

[73] Assignee: Digital Equipment Corporation, Maynard, Mass.

[21] Appl. No.: 219,807

[22] Filed: Mar. 28, 1994

Related U.S. Application Data

[63] Continuation of Ser. No. 765,417, Sep. 25, 1991, abandoned, which is a continuation of Ser. No. 376,300, Jul. 6, 1989, abandoned.

[51] Int. Cl.⁶ .................................................. G06F 13/00
[52] U.S. Cl. ................................ 395/275; 395/425; 364/DIG. 1
[58] Field of Search .............. 395/200, 900, 425, 278; 364/200, 900

[56] References Cited

U.S. PATENT DOCUMENTS

| | | | |
|---|---|---|---|
| 4,136,386 | 1/1979 | Annunziata et al. | 364/200 |
| 4,214,305 | 7/1980 | Tokita et al. | 364/200 |
| 4,495,562 | 1/1985 | Yamaji et al. | 364/200 |
| 4,731,740 | 3/1988 | Eguchi | 364/200 |
| 4,885,680 | 12/1989 | Anthony . | |
| 4,914,570 | 4/1990 | Peacock | 364/200 |

OTHER PUBLICATIONS

*Shared Memory Systems on the Future Bus*, P. Sweazey, Compcon Spring 88 Digest of Papers, San Francisco, 29th Feb.–4th Mar., pp. 505–511, IEEE, New York, US.

*Correct Memory Operation of Cache Based Multi-Processors*, C. Scheurich et al., The 14th Annual International Symposium on Computer Architecture Conference Proceedings, 2nd–5th Jun. 1987, pp. 234–243, IEEE, New York, US.

A. J. Smith, "Cache Memories" *Computing Surveys*, vol. 14, No. 3, Sep., 1982.

*Primary Examiner*—Thomas C. Lee
*Assistant Examiner*—Christopher B. Shin
*Attorney, Agent, or Firm*—Arnold, White & Durkee

[57] ABSTRACT

Methodology and circuitry for managing read and write commands from nodes to a shared memory resource on a common data bus, including nodes with write-back caches, nodes with write-through caches and nodes without caches.

2 Claims, 5 Drawing Sheets

MEMORY SUBSYSTEM COMMAND INPUT QUEUE HAVING STATUS LOCATIONS FOR RESOLVING CONFLICTS

This application is a continuation of application Ser. No. 07/765,417, filed on Sep. 25, 1991, abandoned, entitled Memory Subsystem Input Queue, which is a file wrapper continuation of application Ser. No. 07/376,300, filed on Jul. 6, 1989, abandoned, also entitled Memory Subsystem Input Queue.

FIELD OF THE INVENTION

The present invention relates to memory storage management in a data processing system with a memory resource shared by multiple nodes, and more particularly to methodology and circuitry for managing read and write commands for data from the shared memory resource, such commands originating from nodes having any combination of "write-back" caches, "write-through" caches or no caches on the same data bus.

BACKGROUND OF THE INVENTION

Data processing systems which include multiple nodes and a common data bus for the sharing of data from one or more memory resources may include nodes which have their own memory "caches" for storing and processing data from the shared memory. "Nodes" in the data processing system are any uniquely identifiable entities coupled to the same memory resource, such as central processing units (CPU's) and input/output devices. The shared memory is generally interfaced with the nodes via a common data bus. The nodes with such caches must be interfaced with the shared memory so that blocks of data that they access and acquire are available to any of the nodes. For this purpose, the nodes may have either "write-through" or "write-back" caches.

When a node with a write-through cache decides that it has a need to access a certain block of data, it performs a read command to that block's location in the shared memory. This does not change the "block state" of that block in shared memory. The "block state" of the data block indicates the status of the data block, such as "FREE" or "OWNED".

While the data resides in the node's cache, reads of that data block from that node are referenced to the cache's copy, but writes to that data block update the original data block in shared memory. The write command updates the shared data block in memory, but does not change that data's block state. As the name implies, the node writes through the cache and into the shared memory.

More than one node may cache the same block of data at the same time, but all caching nodes must monitor the bus for write commands directed to the blocks that they have copies of in their respective caches. If a write command to a cached data block is detected, then all nodes that have a copy in their cache perform an invalidate operation on the copy so that it is no longer usable. If they need to read a data block after their cache copy is no longer usable, they send a read command to the data block in shared memory to receive a "clean" copy. In a write-through caching scheme, the data transfers between the cache and the shared memory do not change the block state of the shared memory data blocks.

When a node with a write-back cache decides that it has a need to access a certain block of data, one way it can perform an ownership read on that block's location in the shared memory is to set the block state of that block in shared memory to "OWNED" while the data resides in the node's cache.

While the data resides in the CPU's cache, both reads and writes to that data block use the cache's copy. Writes update the cache's copy of the data, but do not update the shared memory copy. The shared memory copy is updated when the node must "disown" the block because another node wishes to own that block of shared memory, or when the owning node is finished accessing that block.

In a write-back caching scheme, the data transfers between the cache and the shared memory affects the block state of the shared memory blocks. The block state is set to OWNED when the node "borrows" the data block, and the block state is set to FREE when the node "returns" the data block.

When a node with write-back cache "borrows" a data block and sets its block state to OWNED, it assumes that it has the only official copy of the data block. If a node with write-through cache attempts to pull the same data block into its cache, it is clear from the preceding description of the two caching schemes that the integrity of that data block has been lost.

Nodes that do not have any sort of memory cache at all only operate directly upon the data stored in the shared memory. Such nodes do not recognize "ownership" of the shared data as used in systems including nodes with write-back caches, so they cannot distinguish when the requested data is being updated by another one of the nodes.

SUMMARY OF THE INVENTION

The present invention provides compatibility of a shared memory resource with all of the above described node types in a data processing system with a common data bus. A special input queue for the shared memory recognizes commands from nodes that employ write-through caches, from nodes that employ write-back caches and from both nodes without caches at all. The input queue assigns command addresses and conflict resolution states to each read or write command received, and separately stores the commands, states, and if write commands, write data and associated mask data. The stored commands are sequenced to store read and write commands until after potentially conflicting "ownership" commands from nodes in the system with write-back caches are followed by "disown" commands. However, the commands are processed, and corresponding data is written in the memory, with the masking data of the memory so written stored in a mask buffer. When the "disown" commands are executed, the data that has been written in the locations stored in the mask buffer is not rewritten during the disown write operation, thus assuring compatibility. Read commands with command addresses matching "ownership" read commands are deferred until the "ownership" read commands are processed.

DESCRIPTION OF THE PREFERRED EMBODIMENT

Figure 1:
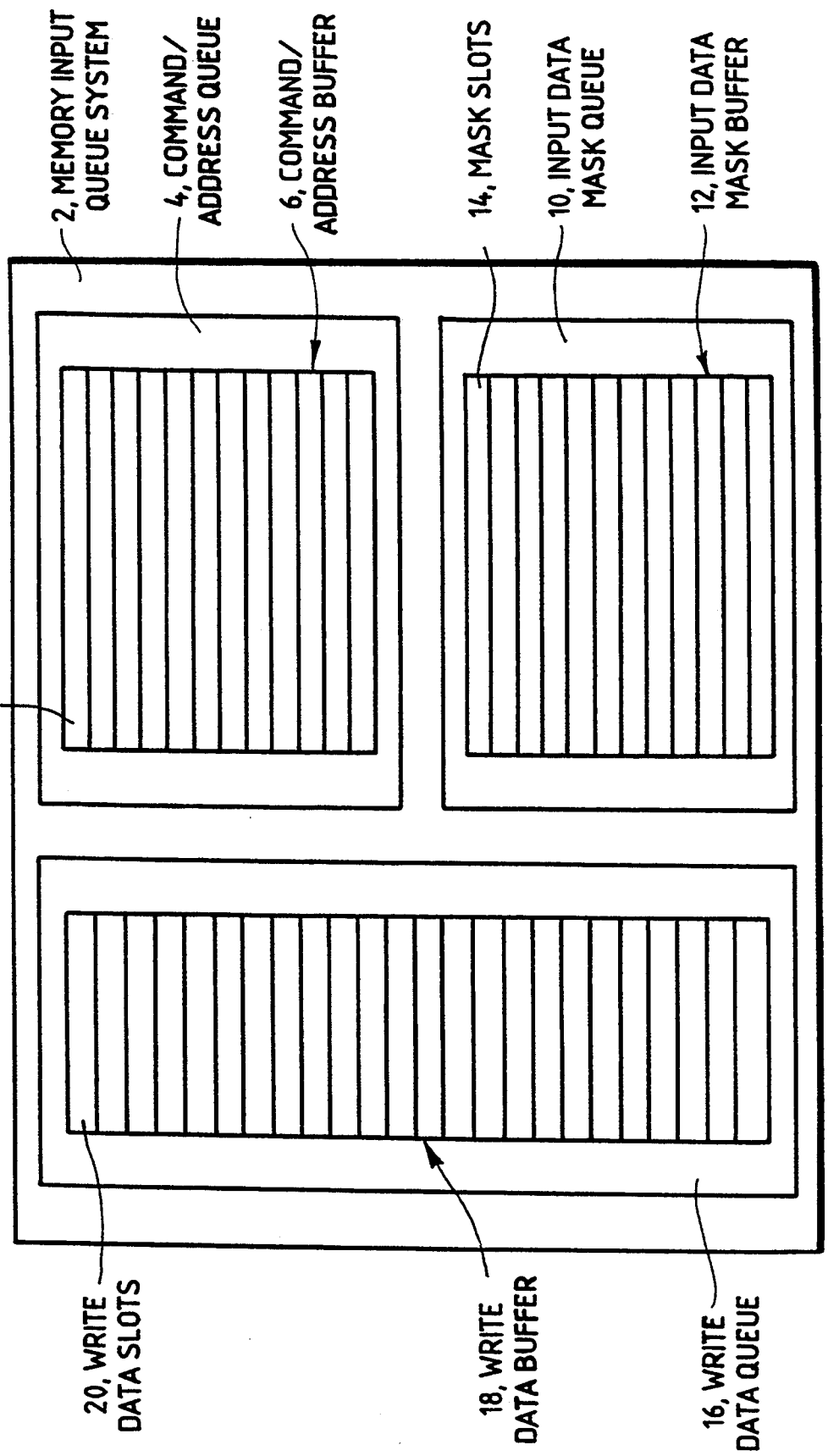
FIG. 1 is a block diagram of a general configuration for a memory input queue system according to the preferred embodiment.

Referring to the drawings, wherein reference characters designate like or corresponding parts throughout the views, FIG. 1 is a general block diagram of a memory input queue system 2 according to the present invention. The input queue system 2 includes a command/address queue 4 for receiving read and write commands from the data processing system (not shown) to the shared memory resource (not shown), with which the input queue system 2 is associated.

The command/address queue 4 has a command/address buffer 6 having a plurality of command/address slots 8, each one capable of holding information that pertains to an entire read or write command. In FIG. 1, the command/address buffer 4 is shown with 12 of the slots 8, although any number of the slots 8 can be used, according to design choice. The information in each of the slots 8 is arranged to indicate command type, command length, command identification, command address, input data storage pointer information and command status. Table 1 shows one arrangement of fields suitable for this purpose.

TABLE I

| Field | Data |
|---|---|
| Command Type | Read, Write, Own Read, Disown Write |
| Command Length | Number of bytes to read or write |
| Command Identification (ID) | Identification of the appropriate commander |
| Command Address | Memory address for read or write command |
| First Data Word Pointer | Pointer to the first data word if a write command |
| Command Slot Status | Free, new, wait, match |

The input queue system 2 also includes an input data mask queue 10. The input data mask queue 10 has an input data mask buffer 12 with a plurality of mask slots 14, with each slot 14 reserved for information about which bytes of a memory word are to be modified by a corresponding write command in one of the slots 8 of the command/address buffer 6 in the command/address queue 4. Although the input data mask buffer 12 is shown with 12 of the slots 14 in FIG. 1, to provide each of the slots 8 in the command/address buffer 6 with a corresponding one of the slots 14 in the input data mask buffer 12, the input data mask buffer 12 may have a greater or lesser number of the slots 14 to correspond to a greater or lesser number of the slots 8 in the command/address buffer 6, according to design choice.

The input queue system 2 also includes a write data queue 16. The write data queue 16 has a write data buffer 18 with a plurality of data slots 20. The slots 20 in the data buffer 18 are allocated for write data to be written to memory with corresponding write commands in the command/address queue 4. Although shown with 24 of the slots 20 in FIG. 1, the data buffer 18 may have a greater or lesser number according to design choice.

Figure 2:
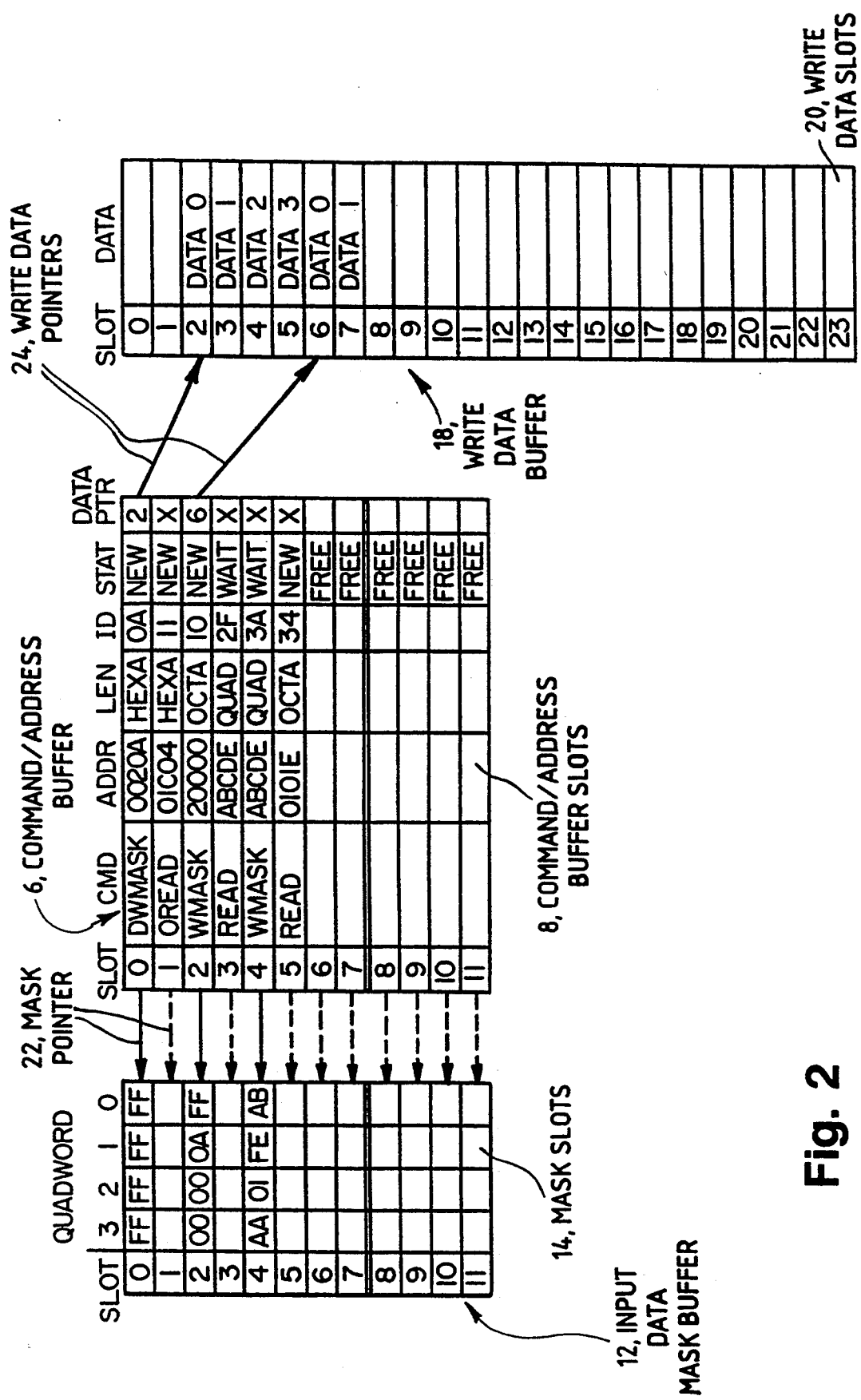
FIG. 2 is a diagram showing the relationships of the command/address queue, the mask queue and the data queue in the input queue system shown in FIG. 1.

FIG. 2 shows an example of how the command/address queue 4 interfaces with the input data mask queue 10 and the write data queue 16o Each of the command/address buffer slots 8 has a mask pointer 22 to a corresponding one of the mask slots 14. If the command in one of the command/address slots 8 is a write command, the mask slot 14 associated with that command/address slot 8 will contain corresponding mask data which properly determines which bytes of the memory word subject to the command will be modified. If the command in the command/address slots 8 is a read type, data in the one of the mask slots 14 associated with the command/address slot 8 is not meaningful, and is represented by a dashed arrow for each associated one of the mask pointers 22 in FIG. 2.

The command/address slots 8 in the command address buffer 6 of the command/address queue 4 which contain write commands have associated write data pointers 24 which point to a corresponding one of the write data slots 20 in the write data buffer 18 of the write data queue 16. The one of the write data slots 20 to which the corresponding one of the data pointers 24 point represents the first one of a possible array of consecutive ones of the write data slots 20 for the corresponding command in one of the command/address slots 8. A read command in one of the command/address slots 8 does not have a corresponding one of the data pointers 24, since there is no write data associated with it.

FIG. 2 shows several commands loaded into the slots 8 of the command/address buffer 6 in the command address buffer queue 4. The first of the slots 8 identified as "Slot 0" has a "disown write" command in the command type field, designated "DWMASK". The memory address for this command is shown as "0020A" in the command address field. The length of the data to be written is shown as a hexaword, designated "HEXA" in the command length field. The identification of the entity making the command, such as a CPU, is shown as "0A" in the command ID field. The status of the slot 8 designated "Slot 0" is shown as "NEW" in the command slot status field. The designated one of the write data slots 20 to which this data is to be written in the write data buffer 18 of the write data queue 16 is shown in the first data word pointer field as "2", which means the one of the write data slots 20 labeled "Slot 2".

In this case, the slot 8 designated "Slot 0" has one of the mask pointers 22 directed to a corresponding one of the input data mask slots 14 in the input data mask buffer 12 of the input data mask queue 10. The slot 14 designated "Slot 0" has 32 bits of mask data for a hexaword, or 32 byte, length of write data, designating the bytes of the memory word addressed in the slot 8 to be modified designated "Slot 0" by the write data beginning at the designated one of the slots 20 in the write data buffer 18. Each bit of the mask data represents one byte of the write data. Since the write data is shown beginning at the slot 20 designated "Slot 2" and the length of the write data is a hexaword, or 32 bytes, the write data extends for the number of consecutive slots from the slot 20 designated "Slot 2" to accommodate the data. In FIG. 2, each of the write data slots 20 are shown as eight bytes in length. Therefore, the write data for the write command in the slot 8 designated "Slot 0" extends from the slot 20 designated "Slot 2" to the slot 20 designated "Slot 5".

The "disown write" designation for the command in the slot 8 designated "Slot 0" means that the command is from a node with a write-back cache in the system which has "checked-out" data starting from the identified address and is now disowning it with this write command which includes modifying the "checked-out" data. The "NEW" status means that the command has been loaded into the input queue system 2, and is ready to be processed in first-in, first-out (FIFO) order when the shared memory (not shown) is no longer busy with the previous command.

The second of the slots 8 identified as "Slot 1" in the command/address buffer 6 has a "ownership read" command in the Command Type Field, designated "OREAD". The memory address for this command is shown as "01C04" in the Command Address field. The length of the data to be read is shown as a hexaword in the command length field. The identification of the entity making the command is shown as "11" in the command ID field. The status of the slot 8 designated "Slot 1" is shown as "NEW" in the Command Slot Status field. There is no write data pointer designation in the first data word pointer field, because this is a read command. Since this is a read command, the mask pointer 22 to the input data mask slot 14 of the input data mask buffer 12 designated "Slot 1" is shown as a dashed arrow, and no mask data is shown in the slot 14 designated "Slot 1".

The "ownership read" designation for the command in the slot 8 designated "Slot 1" means that the command is from a node with a write-back cache in the system which is "checking-out" data starting from the designated address for the indicated data length. Once again, the "NEW" status means that the command has been loaded into the input queue system 2, and is ready to be processed.

The third of the slots 8 identified as "Slot 2" in the command/address buffer 6 has a "write" command in the command type field, designated "WMASK." The memory address for this command is shown as "20000" in the command address field. The length of the data to be written is shown as an octaword or 16 bytes, in the command length field. The identification of the entity making the command is shown as "10" in the command ID field. The status of the slot 8 designated "Slot 2" is shown as "NEW" in the Command Slot Status field. The designated one of the write data slots 20 with the data to be written is shown in the First Data Word Pointer field as "6," which means that its associated pointer 24 points to the one of the write data slots 20 labeled "Slot 6."

In this case, the slot 8 designated "Slot 2" has one of the mask pointers 22 directed to a corresponding one of the input data mask slots 14 in the input data mask buffer 12 of the input data mask queue 10. The slot 14 designated "Slot 2" has 32 bits of mask data for a hexaword length of write data designating the bytes of the memory word addressed in the slot 8 to be modified by the write data beginning at the designated one of the slots 20 in the write data buffer 18. Since the write data is shown beginning at the slot 20 designated "Slot 6" and the length of the write data is an octaword, or 16 bytes, the write data will extend from the slot 20 designated "Slot 6" to the slot 20 designated "Slot 7," since each of these slots is eight bytes long.

The "write" designation for the command in the slot 8 designated "Slot 2" indicates that it is a write command from one of the nodes. The "NEW" status means that the command has been loaded into the input queue system 2, and is ready to be processed.

The fourth of the slots 8 identified as "Slot 3" in the command/address buffer 6 has a "read" command in the command type field, designated "READ." The memory address for this command is shown as "ABCDE" in the command address field. The length of the data to be read is shown as a quadword in the command length field, designated "QUAD". The identification of the entity making the command is shown as "2F" in the command ID field. The status of the slot 8 designated "Slot 3" is shown as "WAIT" in the command slot status field. There is no write data pointer designation in the first data word pointer field, because this is a read command. Since this is a read command, the mask pointer 22 to the input data mask slot 14 of the input data mask buffer 12 designated "Slot 3" is shown as a dashed arrow, and no mask data is shown in the slot 14 designated "Slot 3."

The "read" designation for the command in the slot 8 designated "Slot 3" means that it is a read command from one of the nodes. The "WAIT" status means that this command has been processed already while in the "NEW" state, but it is still pending for some reason. The status of this command will change to the "MATCH" state when the slot 8 designated "Slot 3" is ready to be finished.

The fifth of the slots 8 identified as "Slot 4" in the command/address buffer 6 has a command designated "write" in the Command type field, abbreviated "WMASK". The memory address for this command is shown as "ABCDE" in the Command Address field. The length of data to be written is shown as a quadword in the Command Length field. The identification of the entity making the command is shown as "3A" in the Command ID field. The status of the slot 8 designated "Slot 4" is shown as "WAIT" in the Command Slot Status field. There is no write data pointer designation in the First Data Word Pointer field, because this command has already been processed, as indicated by its "WAIT" status.

The slot 8 designated "Slot 4" has one of the mask pointers 22 directed to a corresponding one of the input data mask slots 14 in the input data mask buffer 12 of the input data mask queue 10. The slot 14 designated "Slot 4" has a hexaword length of mask data designating the bytes of the memory word addressed in the slot 8 have been modified by the write data corresponding to the write command in the slot 8 designated "Slot 4". Of course, this command has already been processed, so that the data has already been modified. Thus, the mask information for this command in the slot 14 designated "Slot 4" indicates which bytes of the addressed memory word have been modified by the processing of this command.

The sixth of the slots 8 identified as "Slot 5" in the command/address buffer 6 has a "read" command in the command type field designated "READ", the memory address for this command is shown as "0101E" in the Command Address field. The length of data to be read is shown as an octaword designated by "OCTA." The identification of the entity making the command is shown as "34" in the Command ID field. The status of the slot 8 designated "Slot 5" is shown as "NEW" in the Command Slot status field. There is no write data pointer designation in the first data word pointer field, because this is a read command. Since this is a read command, the mask pointer 22 to the input data mask slot 14 of the input data mask buffer 12 designated "Slot 5" is shown as a broken arrow, and no mask data is shown in the slot 14 designated "Slot 5".

The remaining six of the slots 8 designated "Slot 6" through "Slot 11" in the command/address buffer 6 all have a state designated as "FREE" in their respective Command Slot status fields. Their other fields are empty. The "FREE" state means that these slots 8 are ready to receive new commands in FIFO order. As a new command is loaded into the input queue system 2, the slot 8 designated "Slot 6" will store the command, and the state will change to "NEW". Likewise, when a subsequent command loaded into the input queue system 2, the slot 8 designated "Slot 7" will store the subsequent command, and the state will change to "NEW". The command stored in the slot 8 designated "Slot 7" will be processed. Similarly, the slots 8 designated "Slot 8" through "Slot 11" will store and process additional commands loaded into the input queue system 2.

Figure 3:
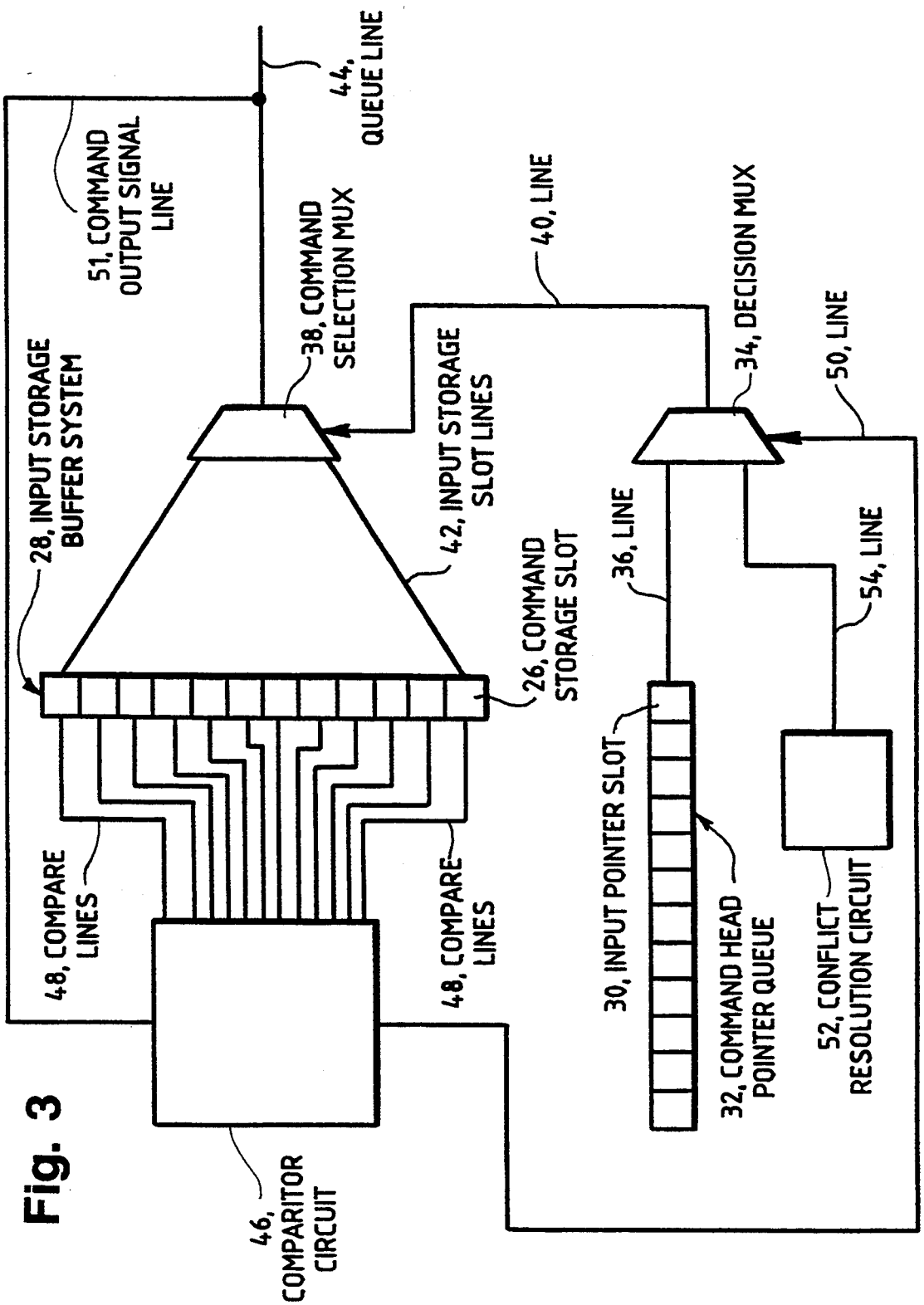
FIG. 3 is a functional block diagram of the input queue system shown in FIG. 1.

FIG. 3 is a simplified block diagram of the input queue system 2, showing only the essential elements. Lines shown to connect data fields between the elements actually comprise a plurality of lines to accommodate the entire data fields. Each command is loaded into a particular command storage slot 26 of an input storage buffer system 28. Each command is referenced by its identification in a corresponding input pointer slot 30 of a command head pointer queue 32. A pointer identification field on the output of the command head pointer queue 32 feeds into an input of a decision multiplexer 34 on a line 36. A command selection field from the output of the decision multiplexer 34 feeds into a select input of a command selection multiplexer 38 on a line 40. The selection multiplexer 38 selects the one of a plurality of input storage slot lines 42 coupled to each of the slots 26 in the input storage buffer 28 which has a command address field corresponding to the command selection field on the line 40. The selection multiplexer 38 then produces an output field with the command stored in the selected slot 26 on a head of queue line 44. The command outputted on the line 44 is then processed. Each of the slots 26 has a command address associated with it, and the address of every one of the slots 26 containing a command is compared to the address of the command on the head of queue line 44 in a comparitor circuit 46 via a plurality of compare lines 48 from each of the slots 26 and via a command output signal line 51 coupled to the line 44. When any of the command addresses in the slots 26 of the input storage buffer 28 match the address of the command address on the head of queue line 44 via the line 51, the output of the comparitor circuit 46 indicates the match to the input pointer decision multiplexer 34 via a line 50. At this point, a conflict resolution is performed upon the input queue system 2, and the multiplexer 34 de-selects the new input pointer queue 32 and selects a conflict resolution circuit 52 coupled to the multiplexer 34 via a line 54 instead. The conflict resolution circuit 52 selects each of the command addresses which match the address on the command field on the head of queue line 44 in order of the slot addresses of their slots 26, lowest first. Each of the matching command addresses is cleared as soon as its associated read commands are performed, so that upon the performance of all the matching addresses, the comparison circuit 46 allows the multiplexer 34 to de-select the conflict resolution circuit 52 and select the new input pointer queue 32 once again.

Figure 4:
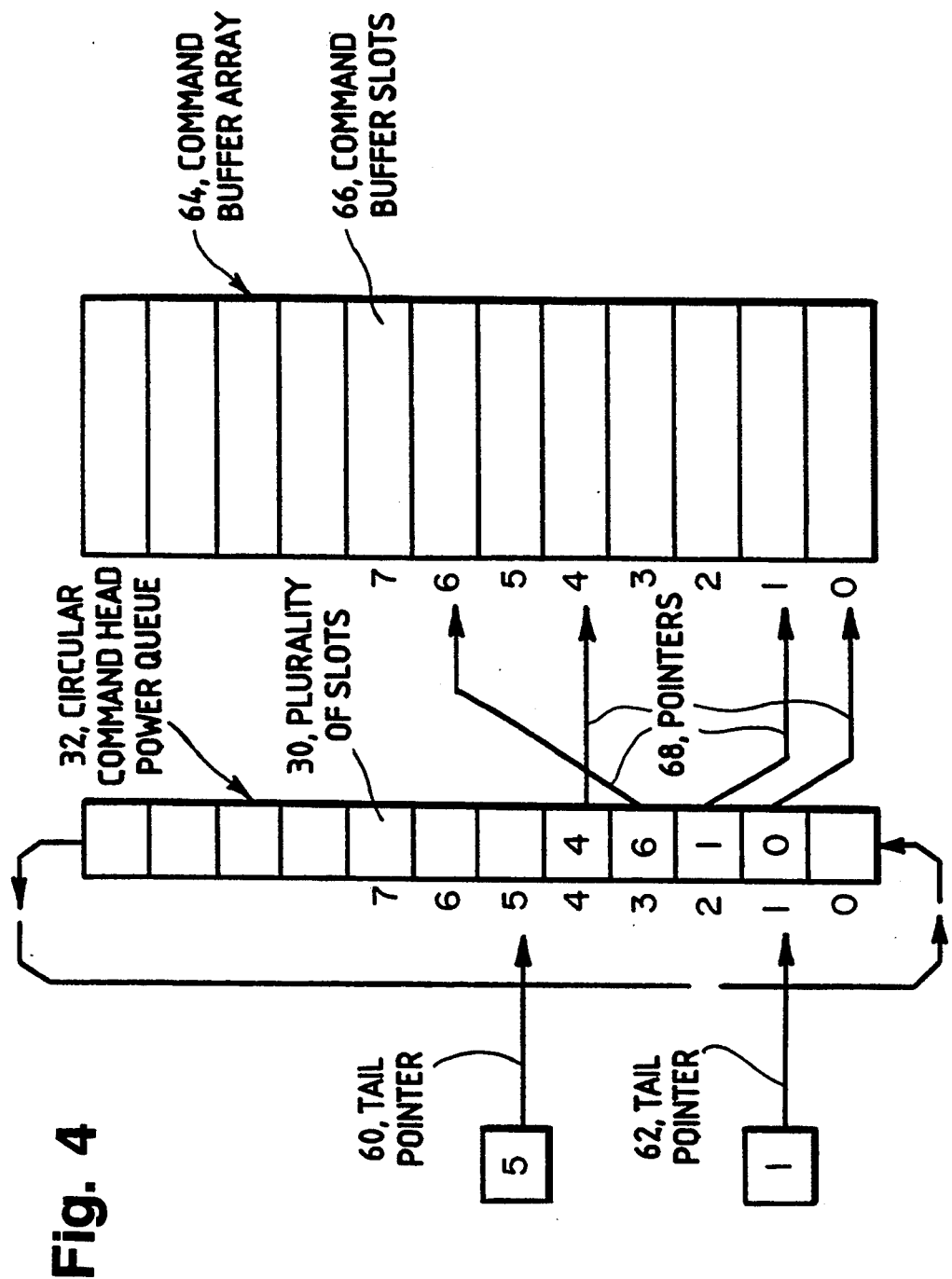
FIG. 4 is a block diagram of the command loading and processing system for the input queue system shown in FIG. 1.

FIG. 4 shows how commands are loaded into and processed from the input queue system 2. Commands are loaded sequentially into the plurality of slots 30 of the circular command head pointer queue 32 shown in FIG. 3. Twelve of the slots 30 are shown in FIG. 4, although a greater or lesser number of the slots 30 can be used according to design choice. The commands are loaded according to the direction of a tail pointer 60 which sequentially points each of the commands to the lowest free one of the slots 30. The boxes on the tail ends of the pointers 60 and 62, containing the values "5" and "1" respectively, merely represent the addresses of the slots 30 to which they point. New commands are sequentially processed according to the direction of a head pointer 62 which sequentially points each of the commands to the lowest one of the slots 30 having a command entry. Resolved read commands may intervene between the new commands.

The input queue system 2 also has a command buffer array 64 which includes a plurality of command buffer slots 66. Twelve of the command buffer slots 66 are shown, although a greater or lesser number of the slots 66 may be used. There can be a greater or lesser number of the slots 66 as there are the slots 30. The command buffer slot 66 to which each pointer 68 points contains the command address, command type, status, the length, node ID and mask information for the command having the same slot address stored in the command head pointer queue 32. The command buffer array 64 is functionally the equivalent of the input command/address queue 4, the input data mask queue 10.

Figure 5:
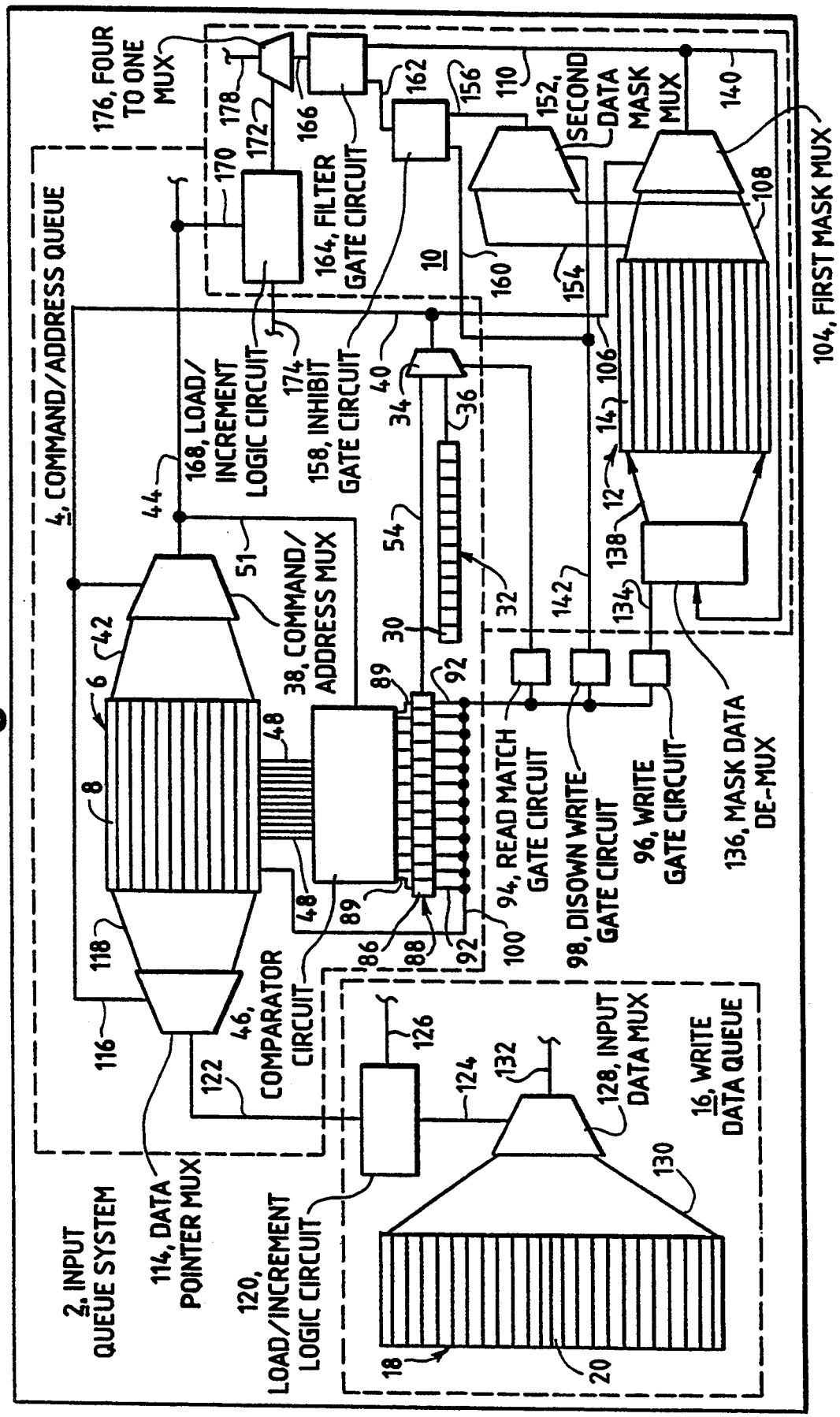
FIG. 5 is a detailed block diagram of the preferred embodiment shown in FIG. 1.

FIG. 5 is a detailed block diagram of the preferred embodiment in FIG. 1 which shows how the major elements interconnect. Lines shown to connect data fields between the elements actually comprise a plurality of lines to accommodate the entire data fields. The command head pointer queue 32 described above in FIG. 3 is included in the command/address queue 4. As commands are received by the input queue system 2, the commands are loaded into the command/address buffer 6, the input data mask buffer 12 and the input data buffer 18 as described above in connection with FIG. 1. At the same time, the slot address of each command in the slots 8 of the command/address buffer 6 is entered into a corresponding one of the slots 30 of the command head pointer queue 32. The slot address field at the head of the command head pointer queue 32 is fed to one input of the two input multiplexer 34 via the line 36. The multiplexer 34 normally selects the line 36, and passes the slot address field on the line 36 through its output on the line 40.

The slot address field on the line 40 is fed to the select input of the command/address multiplexer 38 having a plurality of multiplexer inputs. In FIG. 5, the command/address multiplexer 38 is shown with 12 multiplexer inputs, to provide a separate input for each of the slots 8 of the command/address buffer 6. A greater or lesser number of inputs can be used, depending upon the number of slots 8 in the command/address buffer 6 and so long as the command/address multiplexer 38 has at least one input for each of the slots 8. Each of the slots 8 feed one of the inputs of the multiplexer 38 via one of the plurality of lines 42. The multiplexer 38 selects the one of the slots 8 with a slot address field matching that on the line 40 from the multiplexer 34. The multiplexer 38 passes the command type, address, length, node ID and status data of the command in the selected one of the slots 8 on the line 44. This command and address data is the output for the head of the command/address queue 4.

At the same time, the command and address data on the line 44 is transferred to a reference input of the comparator circuit 46 via the line 51. The comparator circuit 46 has a plurality of compare inputs and outputs, with at least as many compare inputs and outputs as the number of the slots 8 in the command address buffer 6. In FIG. 5, the comparator circuit 46 has 12 compare inputs and 12 compare outputs, with one reference input. Each of the slots 8 feed one of the compare inputs of the comparator circuit 46 via one of a plurality of the lines 48. The comparator circuit 46 compares the command address fed to the reference input via the line 51 with the command addresses of each of the commands in the slots 8. If there is a match, the slot address of the slot 8 for the matching command address is passed through a corresponding one of the compare outputs and fed to a corresponding one of a plurality of match slots 86 in a match buffer 88 via a plurality of lines 89. The match buffer 88 has at least as many of the slots 86 as the number of slots 8 in the command/address buffer 6. In FIG. 5, 12 of the slots 86 are shown.

Each of the slots 86 also stores the type of the corresponding command which matches the address of the command at the head of the command/address queue, so that the match may be identified as a read match, a write match or a disown write match. The slot addresses of the matches are consecutively read from the lowest slot address of the slots 86 of the match buffer 88, and each slot address is fed to a second input of the multiplexer 34 via the line 54° The match buffer 88 also identifies the type of the command read from each of the slots 86 via a corresponding one of a plurality of lines 92. This command type data is transferred to respective inputs of a read match gate circuit 94, a write gate circuit 96 and a disown write gate circuit 98 via a data bus 100. Alternatively, the comparitor circuit 46 may be arranged to transfer the command/address data from each of the slots 8 having matching addresses directly from the slots 8 to the data bus 100.

Where there is a read match, the read match gate circuit 94 supplies a select signal on its output, which is fed to a select input on the multiplexer 34 via the line 50. The signal on the line 50 causes the multiplexer 34 to choose the slot address from the match buffer 88 on the line 54 instead of the slot address on the line 36 from the new command head pointer queue 32. The multiplexer 34 then passes the slot address on the line 54 to the select input of the command/address multiplexer 38 via the line 40. The multiplexer 38 then selects the slot 8 of the command/address buffer 6 with the corresponding slot address. In this way, the detection of a read match changes the order of processing commands from the order arranged by the command head pointer queue 32 to the order of the matches in the slots 86 of the match buffer 88.

Write commands involve selecting the appropriate mask data and input data from the input queue system 2. This does not change the order of processing. The slot address on the line 40 is also fed via a line 106 to a select input of a first mask multiplexer 104 having a plurality of multiplexer inputs. The multiplexer 104 has at least as many multiplexer inputs as the number of slots 14 in the input data mask buffer 12. In FIG. 5, the multiplexer 104 has 12 inputs, each of the slots 14 of the input data mask buffer 12 feeding one of the multiplexer inputs of the multiplexer 104 via a corresponding one of a plurality of lines 108. The multiplexer 104 selects the one of the slots 14 with a slot address matching the slot address on the line 106, and passes the mask data for the selected slot 14 through its output to a line 110. Thus, the mask data on the line 110 corresponds to the command/address data on the line 44.

The slot address on the line 40 is also fed via a line 116 to the select input of a data pointer multiplexer 114 having a plurality of multiplexer inputs. The multiplexer 114 has at least as many multiplexer inputs as the number of slots 8 in the command/address buffer 6. In FIG. 5, the multiplexer 114 has 12 multiplexer inputs, each multiplexer input fed from one of the slots 8 via a corresponding one of a plurality of lines 118. The multiplexer 114 selects the one of the slots 8 having a slot address matching the slot address on the line 116, and passes the data pointer data from the selected slot 8 to an input of a well known load/increment logic circuit 120 via a line 122. The load/increment logic circuit 120 initially loads the data pointer data on the line 122 through its output on a line 124 in response to an increment logic control field fed to a logic input on a line 126. The increment logic control field is supplied by any well known increment logic control circuitry (not shown).

The data pointer data on the line 124 is fed to a select input of an input data multiplexer 128 having a plurality of multiplexer inputs. The multiplexer 128 has at least as many multiplexer inputs as the number of the slots 20 in the write data buffer 18. In FIG. 5, the multiplexer 128 has 24 multiplexer inputs, each multiplexer input fed from one of the slots 20 via a corresponding one of a plurality of lines 130. The multiplexer 128 selects one of the slots 20 with the data pointer data matching the data pointer data on the line 124. The multiplexer 128 passes the input data from the selected slot 20 through its output on a line 132, which serves as the head of the write data queue 16. The increment logic circuit 120 increments the value of the data pointer data on the line 124, slot by slot, in a circular sequence, wrapping around the slot addresses of the slots 20 as the data is transferred from each of the slots 20 to the line 132. This is done by the increment logic control field on the line 126.

When the match buffer 88 identifies a write command from one of the slots 86 and the queue head command on the line 44 is also a write command, the write match gate circuit 96 produces a slot address field on the line 134 which corresponds to the slot address of the write command in the corresponding one of the slots 8 of the command/address buffer 6. The slot address on the line 134 feeds a select input of a mask data de-multiplexer 136 with a single multiplex input and a plurality of outputs. The de-multiplexer 136 has at least as many outputs as the number of slots 14 in the input data mask buffer 12. Each of the outputs of the de-multiplexer 136 feeds a different one of the slots 14 via a corresponding one of a plurality of lines 138. The mask data on the line 110 feeds the multiplex input of the de-multiplexer 136 via a line 140. The de-multiplexer 136 selects the one of the slots 14 which has a slot address matching the slot address on the line 134. In this way, the mask data on the line 140 is merged with the mask data stored in the selected one of the slots 14.

When the match buffer 88 identifies a disown write command from one of the slots 86, the disown write match gate circuit 98 produces a slot address field on a line 142. The slot address field on the line 142 is fed into a select input of a second data mask multiplexer 152 having a plurality of multiplex inputs. The multiplexer 152 has at least as many multiplex inputs as the number of the slots 14 in the input data mask buffer 12. In FIG. 5, the multiplexer 152 has 12 inputs, with each input fed from one of the slots 14 via a corresponding one of a plurality of lines 154.

The multiplexer 152 selects the one of the slots 14 which has a slot address matching the slot address on the line 142. The multiplexer 152 passes the mask data from the selected slot 14 through its output on a line 156. The mask data on the line 156 is fed into a first input of an inhibit gate circuit 158. The enable signal from the disown write gate circuit 98 on the line 142 is fed to a second input of the gate circuit 158 via a line 160. The inhibit gate circuit 158 produces a mask data inhibit field on the line 156 through its output on a line 162 when the enable signal is present on the line 160.

The mask data field on the line 110 is fed to a first input of a filter gate circuit 164. The mask data inhibit field on the line 162 is fed to the second input of the filter gate circuit 164. When there is no enable signal from the disown write gate circuit 98, there is no mask data inhibit field on the line 162, so the gate circuit 164 passes the mask data through its output on a line 166. However, when the enable signal is present on the line 142, the mask data on the line 156 produces the mask data inhibit field in the gate 158. Since there is then a mask data inhibit field on the line 162 corresponding to the mask data on the line 110, the filter gate circuit 164 blocks the mask data which has already been written from being transferred to the line 166 during the period of a disown write command. This prevents the disown write command from writing over data previously written with other write commands. This simulates the steps of performing the disown command first and then performing the matching write commands.

The lower address bits of command/address field on the line 44 feed into an input of a well known load/increment logic circuit 168 via a line 170. The load/increment logic circuit 168 passes the lower address bits of the command/address data field on a line 172 in response to a load logic control signal fed to a logic control input of the increment logic circuit 168 on a line 174. The increment logic control signal is developed by well known increment logic circuitry (not shown). The address data on the line 172 feeds a select input of a four-to-one multiplexer 176. The line 166 feeds the input of the multiplexer 176. The multiplexer 176 selects a byte of mask data on the line 166, each bit in the byte representing a byte of a quadword which corresponds to the address data on the line 172. The multiplexer 176 passes the selected mask data through its output on a line 178, which serves as the head of the input data mask queue 10. The increment logic circuit 168 sequentially increments the address on the line 172 in response to the increment logic control signal on the line 174 to sequentially output each of the bytes of mask data in the selected slot 14 of the input data mask buffer 12.

The memory subsystem input queue according to the present invention as described above sorts out the read and write commands received by a shared memory resource from different CPU's in a data processing system to prevent conflicting commands from occurring, even when the data processing system includes a mixture of nodes with write-back caches, nodes with write through caches and nodes without caches. The input queue stores received commands and sequentially processes them in a FIFO manner until a disown write command is processed.

When a read command is processed, and the located is owned, the read command is given a transitory "wait" status and its execution is deferred. When a write command is processed, and the location is owned, the write proceeds, and the command information and mask data are saved on the input queue in their then current slots. The write command is given a transitory "wait" status. If a previous write command for the same address is already in the "wait" status, the mask data of the current write command is merged with the mask data of the previous write command. Only one write command in the "wait" state will remain for that address.

When a disown write command is processed, the input queue finds any of the other received commands that have been stored that have the same command address. The mask data of the matched address commands of the write type are used to inhibit the mask data of the disown write command from rewriting over the data written by the matched address commands of the write type that have the wait status.

In this way, write commands issued by nodes which do not have write-back caches and do not recognize ownership of data blocks are not destroyed by the disown write command of a node with a write-back cache. The matched address commands of the read type, including those having the match status, are then processed. In this way, the read commands from nodes which do not have write back caches and do not recognize the ownership of data blocks will not be processed until the disown write command frees the data block.

Thus, there has been described herein methodology and circuitry for managing read and write commands to a shared memory resource from nodes with write-back caches, nodes with write-through caches, and nodes without caches. It will be understood that various changes in the details, arrangements and configuration of the parts and systems which have been described and illustrated above in order to explain the nature of the present invention may be made by those skilled in the art within the principle and scope of the present invention as expressed in the appended claims.

We claim:

1. A method of resolving conflicts between execution of commands from a plurality of nodes to a shared memory resource by use of a memory input queue, said commands each being directed to a specific address in said shared memory resource, said memory input queue having a plurality of storage locations that are available for storage of said commands, each of said plurality of storage locations having a "free" state, a "new" state, a "wait" state and a "match" state, at least one of said plurality of nodes having a write-back cache and at least one of said plurality of nodes not having a write-back cache, said commands comprising "ownership read" type and "disown write" type commands from said at least one of said plurality of nodes with a write-back cache, and "read" type and "write" type commands from said at least one of said plurality of nodes without a write-back cache, said memory input queue being connected between said plurality of nodes to receive said commands therefrom and said shared memory resource to access said shared memory resource, said method comprising the steps of:

receiving any of said commands in said memory input queue as received commands;

setting each of said plurality of storage locations in said memory input queue that is available for storage of said commands into said "free" state;

storing each of said received commands in one of said storage locations as stored commands in said memory input queue and changing the state of said one of said storage locations from said "free" state to said "new" state to indicate that said stored commands are to be processed;

creating mask data corresponding to each of said stored commands of said "disown write" type and said "write" type;

selecting each of said stored commands from said storage locations in said memory input queue;

changing, from said "new" state to said "wait" state, the state of each of said storage location that stores one of said stored commands if said one of said stored commands is directed to the same specific address in said shared memory resource as another one of said stored commands of the "ownership read" type or "disown write" type;

deferring the execution of each of said stored commands of the "read" type in said "wait" state until at least one of said stored commands of the "ownership read" type or "disown write" type is executed;

merging and storing said mask data that corresponds to each of said stored commands of the "write" type to create merged mask data;

for each of said stored commands of the "disown write" type changing, from said "wait" state to said "match" state, the state of each of said storage locations in said memory input queue that stores one of said stored commands that is directed to the same address in said shared memory resource as any of said stored commands of the "disown write" type and using said mask data of said stored commands of the "write" type from said storage locations in said "match" state to inhibit said mask data of each of said stored commands of the "disown write" type during execution and executing each of said stored commands of the "read" type from said storage locations in said "match" state after execution of said stored commands of the "disown write" type;

after execution of any of said stored commands that are not directed to the same address in said shared memory resource as any other of said stored commands of the "ownership read" or "disown write" type, changing the storage location that stores said any one of said stored commands from said "new" state to said "free" state to indicate that said storage location that stores said any one of said stored commands is available to receive a new one of said commands; and after execution of one of said stored commands from one of said storage locations in said "match" state, changing said one of said storage locations in said "match" state from said "match" state to said "free" state to indicate that said storage location that was changed from said "new" state to said "free" sate is available to store a new one of said commands.

2. Circuitry for resolving conflicts between execution of commands from a plurality of nodes to a shared memory resource by use of a memory input queue, said commands each being directed to a specific address in said shared memory resource, said memory input queue having a plurality of storage locations that are available for storage of said commands, each of said plurality of storage locations being in a "free" state, a "new" state, a "wait" state or a "match" state, at least one of said plurality of nodes having a write-back cache and at least one of said plurality of nodes not having a write-back cache, said commands comprising "ownership read" type and "disown write" type commands from each of said plurality of nodes with a write-back cache, and "read" type and "write" type commands from each of said plurality of nodes without write-back caches, said memory input queue being connected between said plurality of nodes to receive said commands therefrom and said shared memory resource to access said shared memory resource, said circuitry for resolving conflicts comprising:

means for executing said commands;

means for receiving any of said commands in said memory input queue as received commands;

means for setting each of said plurality of storage locations in said memory input queue that is available for storage of said commands to said "free" state;

means for storing each of said received commands in one of said storage locations as stored commands and changing the state of each of said storage locations that stores one of said stored commands from said "free" state to said "new" state to indicate that said stored command is to be processed;

means for determining said specific address for each of said stored commands:

means for selecting each of said stored commands;

means for changing from said "new" state to said "wait" state the state of each of said storage locations that stores one of said stored commands if said one of said stored commands is directed to the same specific address in said shared memory resource as another one of said stored commands of the "ownership read" or "disown write" type;

means for deferring the execution of each of said stored commands of the "read" type in said "wait" state until at least one of said stored commands of the "ownership read" or "disown write" type is executed;

means for creating mask data corresponding to each of said stored commands of said "disown write" type and said "write" type;

means for merging and storing said mask data to create merged mask data corresponding to each of said stored commands of the "write" type in said "wait" state;

means responsive to one of said stored commands of the "disown write" type for changing from said "wait" state to said "match" state the state of each of said storage locations that stores one of said stored commands of the "write" type or the "read" type that is directed to the same specific address in said shared memory resource as said one of said stored commands of the "disown write" type and using said merged mask data of said stored commands of the "write" type that are directed to the same specific address to inhibit said mask data of said one of said stored commands of the "disown write" type during execution and executing said stored commands of the "read" type that are directed to the same specific address after execution of said one of said stored commands of the "disown write" type;

means for changing each storage location that stores one of said stored commands that is not directed to the same specific address in said shared memory resource as any of said stored commands of the "ownership read" type or disown write" type from said "new" state to said "free" state after the execution of said one of said stored commands that is not directed to the same specific address in said shared memory resource as any of said stored commands of the "ownership read" type or "disown write" type to indicate that said storage location that was changed from said "new" state to said "free" state is available to store a new one of said commands; and means for changing each storage location that stores one of said stored commands in said "match" state after the execution of said one of said stored commands in said "match" state from said "match" state to said "free" state to indicate that said storage location that was changed from said "match" state to said "free" state is available to store a new one of said commands.

* * * * *